(12) United States Patent
Mandelartz et al.

(10) Patent No.: US 7,908,958 B2
(45) Date of Patent: Mar. 22, 2011

(54) BALLISTIC RESISTANT LAMINATED STRUCTURE

(75) Inventors: Matthias Mandelartz, Herzogenrath (DE); Stephane Leray, Sully sur Loire (FR); Pierre Chaussade, Orleans (FR)

(73) Assignee: Saint-Gobain Glass France, Courbevoie (FR)

( * ) Notice: Subject to any disclaimer, the term of this patent is extended or adjusted under 35 U.S.C. 154(b) by 520 days.

(21) Appl. No.: 11/993,629

(22) PCT Filed: Jun. 23, 2006

(86) PCT No.: PCT/FR2006/050625
§ 371 (c)(1),
(2), (4) Date: Feb. 15, 2008

(87) PCT Pub. No.: WO2006/136761
PCT Pub. Date: Dec. 28, 2006

(65) Prior Publication Data
US 2010/0132540 A1 Jun. 3, 2010

(30) Foreign Application Priority Data

Jun. 24, 2005 (FR) ..................... 05 51755

(51) Int. Cl.
| | |
|---|---|
| F41H 5/04 | (2006.01) |
| F41H 5/24 | (2006.01) |
| F41H 7/02 | (2006.01) |
| B32B 17/10 | (2006.01) |
| B32B 3/02 | (2006.01) |
| B63G 13/00 | (2006.01) |
| B64D 7/00 | (2006.01) |

(52) U.S. Cl. ......... 89/36.02; 428/119; 428/120; 89/904; 89/905; 89/910; 89/912; 89/914; 89/915; 89/917; 89/920; 89/930

(58) Field of Classification Search ................ 89/36.01, 89/36.02, 36.04, 36.07, 36.11, 36.12, 36.13, 89/36.15; 428/119, 120
See application file for complete search history.

(56) References Cited

U.S. PATENT DOCUMENTS

| | | | | |
|---|---|---|---|---|
| 2,068,082 A | * | 1/1937 | Sherts ........................... | 428/124 |
| 3,380,406 A | * | 4/1968 | Gosnell ........................... | 109/80 |
| 3,917,891 A | * | 11/1975 | Cooke et al. .................. | 428/337 |
| 3,930,452 A | * | 1/1976 | Van Laethem et al. ......... | 109/80 |
| 4,321,777 A | * | 3/1982 | Sauret et al. .................... | 52/308 |
| 5,637,363 A | * | 6/1997 | Leray et al. .................... | 428/34 |

(Continued)

FOREIGN PATENT DOCUMENTS
EP        0 693 366        1/1996

(Continued)

*Primary Examiner* — Bret Hayes
(74) *Attorney, Agent, or Firm* — Oblon, Spivak, McClelland, Maier & Neustadt, L.L.P.

(57) ABSTRACT

The invention relates to a ballistic resistant laminated structure comprising at least three glass sheets (1, 3, 5) a polycarbonate sheet (11) which are bound by adhesive layers (2, 4, 10) and a shielding insert (20), wherein a space delimited by said insert (20), the end face of the sheet (5) and the edge of the sheet (11) are provided with a material (30, 31) for absorbing the energy of a projectile. Said materials (30, 31) are embodied in the form of an yielding material (30) for degassing during assembling said stricture and an encapsulating material (31). A highly ballistic resistant glazing for a building or a transport vehicle comprising the inventive structure is also disclosed.

12 Claims, 1 Drawing Sheet

U.S. PATENT DOCUMENTS

| | | | | |
|---|---|---|---|---|
| 5,747,170 | A | * | 5/1998 | Von Alpen et al. ............ 428/426 |
| 6,327,954 | B1 | * | 12/2001 | Medlin ......................... 89/36.08 |
| 6,708,595 | B1 | * | 3/2004 | Chaussade et al. .......... 89/36.02 |
| 2001/0032540 | A1 | * | 10/2001 | Gourio ......................... 89/36.02 |
| 2006/0027090 | A1 | * | 2/2006 | Gonzalez ..................... 89/36.04 |

FOREIGN PATENT DOCUMENTS

WO    01/00403    1/2001

* cited by examiner

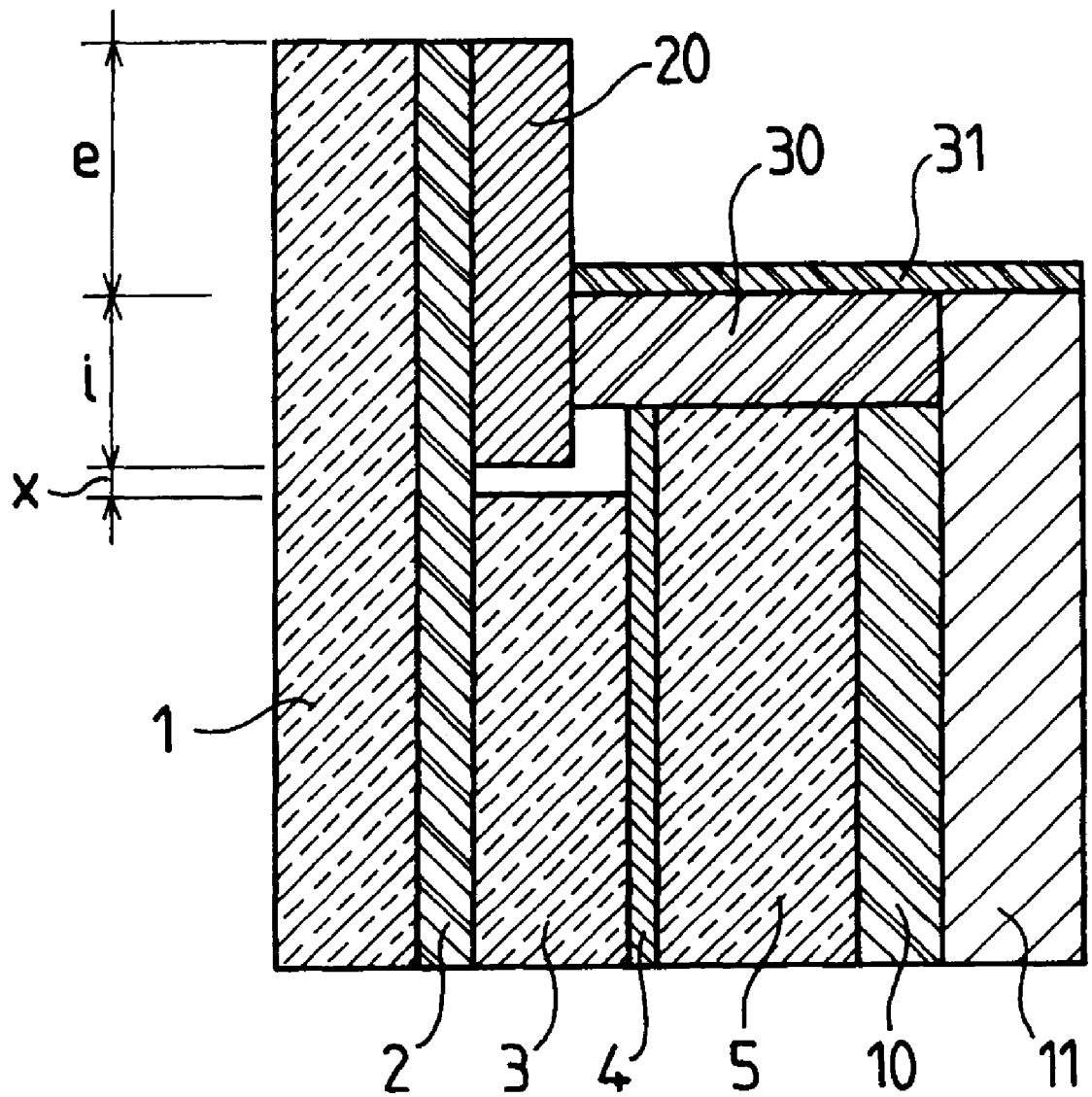

BALLISTIC RESISTANT LAMINATED STRUCTURE

BACKGROUND OF THE INVENTION

I. Field of the Invention

The present invention relates to laminated structures of high bullet resistance, especially transparent ones such as those used as armored glazing.

The term "bullet resistance" is understood to mean, within the context of the invention, a resistance to level BR 3 (caliber: 375 Magnum), BR 4 (caliber: 44 Magnum), BR 5 (caliber: 5.56×45), and up to level BR 6 (caliber: 7.62×51) of the FR EN 1063 standard and also, in particular, to Kalachnikov bullets (caliber: 7.62×39).

The armored glazing referred to is particularly suitable for use as architectural glazing or, in particular, as glazing for armored transport vehicles.

II. Description of Related Art

The laminated structures of high bullet resistance of the invention include a peripheral metal armoring insert introduced into a cavity of the laminated structure, in the extension of and with a spacing from 0.2 to 1.3 mm, of one of its constituent glass sheets.

Moreover, many transport vehicle windows make, on their periphery, a certain angle to the horizontal, for example around 45°. Consequently, a horizontal shot at this periphery will also have an angle of incidence of around 45°.

The inventors have noticed that, under these conditions, a shot fired into the region bounded by the insert, and at a short distance therefrom, especially between 15 and 20 mm, from the inner edge of the insert, is liable to cause damage inside the vehicle. Specifically, it is a region of about 200 mm of glass that absorbs the impact; the polycarbonate usually forming the face inside the vehicle deforms in such a way that glass splinters are liable to be projected into the vehicle.

BRIEF SUMMARY OF THE INVENTION

The object of the invention it therefore to protect the user from one or more shots fired close to the inner edge of the peripheral armoring insert, especially at an angle of incidence of around 45°.

For this purpose, the subject of the invention is a laminated structure comprising, in succession: at least a first glass sheet; a second glass sheet connected to the first via an adhesive layer, the edge of the second glass sheet being set back from that of the first on at least one side; a third glass sheet connected to the second via an adhesive layer, the edge of the second glass sheet being, on at least said side, set back from that of the third which is itself set back from that of the first; optionally one or more additional glass sheets connected to the third and, where appropriate, to one another via one or more adhesive layers; a sheet for dampening the impact of a projectile, is connected to the third or last glass sheet via an adhesive layer; and an armoring insert made of material of high bullet resistance that occupies, on at least said side, at least part of the cavity bounded by the edges of the first and third glass sheets and the end face of the second glass sheet. This laminated structure in accordance with the invention is remarkable for the fact that, on at least said side, the edges of the third glass sheet and of said additional glass sheet or sheets are set back from that of the sheet in order to dampen the impact of a projectile, and that the space between the armoring insert, the end face of the third glass sheet and the edge of the sheet for dampening the impact of a projectile is at least partly occupied by a material capable of absorbing the energy of a projectile, and that this material capable of absorbing the energy of a projectile is bonded to the armoring insert, to the end face of the third glass sheet and to the sheet for dampening the impact of a projectile, via a material capable of flowing and of ensuring degassing during assembly of the laminated structure, and that an encapsulation material, impervious to the material flowing during the assembly and impermeable to the penetration of moisture into the laminated structure, encapsulates at least that portion of the end face of said laminated structure which lies between the end face of the sheet for dampening the impact of a projectile and at least part of the armoring insert.

The laminated structure of the invention provides lasting bullet protection, including under the extreme conditions mentioned above. This is due both to:

the use of the material capable of absorbing the energy of a projectile;

the quality of the bonding obtained thanks to the capability of the adhesive to flow and ensure degassing in the autoclave during assembly of the laminate; and the encapsulation of the end face of part of the laminated structure comprising in particular the interface between the sheet for dampening the impact of a projectile and the adhesive layer to which it is connected, lastingly preventing penetration of moisture and therefore delamination thereat.

The operation of assembling the sheets involved in the construction of a mass-produced glazing unit comprises, usually, the following steps: Firstly said sheets are placed in a hermetically sealed bag under vacuum. Next, this bag is placed in an autoclave within which the pressure is, in particular between 8 and 14 bar and the temperature is between 100 and 140° C. During baking in the autoclave, the flexible plastic tends to flow under the action of the temperature, thereby extending over the end face of the glazing.

The material capable of flowing and ensuring degassing during assembly of the laminated structure and the encapsulation material are advantageously applied to the sheets before the baking of the laminated structure in the autoclave. It is necessary, when these materials completely surround the periphery of the structure, to provide passages so that the gases released during assembly can escape. According to an advantageous variant, the material capable of flowing and ensuring degassing is permeable to air and to water vapor, thus allowing these gases to escape without impairing the quality of the assembly. Optionally, accessory means may be used to make this degassing easier. This material is moreover compatible with the encapsulation material and the material constituting the sheet for dampening the impact of a projectile.

A bullet fired a short distance from the lower edge of the armoring insert, toward the interior of the laminated structure—that is to say in the daylight portion—with an angle of incidence of about 45° C. and a rising direction, will not encounter the third glass sheet but the material capable of absorbing the energy of the projectile. This material is firmly and durably held in place by the encapsulation material and the sheet for dampening the impact of a projectile. This device is by nature capable of stopping the bullet. A glass splinter can no longer penetrate the side where the user is, either through the sheet for dampening the impact of the projectile or with delamination of the edge of said sheet.

In an advantageous configuration, the encapsulation material is set back from the edge of the first glass sheet in such a way that this encapsulation material forms, with the edge of the adhesive layer connecting the first and second glass sheets and the edge of the armoring insert, a projection with a thickness allowing it to be inserted into a frame or rebate in the mounting position.

The material capable of flowing and ensuring degassing during the assembly of the laminated structure is chosen from a thermoplastic polymer or copolymer with a softening temperature between 80 and 140° C., such as a thermoplastic polyurethane, possibly combined with polyvinyl butyral, ethylene/vinyl acetate copolymer or a composite made up from one or more of them and from fiber or fabric made of glass, aramid, polycarbonate, steel or the like.

The encapsulation material is preferably chosen from a material that does not soften at the temperatures at which the laminate is assembled in the autoclave, namely between 100 and 140° C., especially a material having a softening temperature between 145 and 190° C., a thermoplastic elastomer, polyvinyl chloride, a thermoplastic or thermosetting polyurethane, polyethylene terephthalate, neoprene, rubber, epoxy resin, or a composite made up from one or more of them and of fiber or fabric made of glass, aramid, polycarbonate, steel or the like.

The encapsulation material has a softening temperature above the temperature used during the baking in the autoclave. It thus constitutes a stop without preventing any flow of the material capable of flowing and ensuring degassing. For standard use conditions, namely an autoclave temperature between 100 and 140° C., the softening temperature of the encapsulation material is, for example, between 145 and 190° C. Moreover, the encapsulation material has mechanical properties sufficient for both correcting and adapting to any alignment defects. It Shore A hardness is for example between 70 and 90. Preferably, it has for example an elongation at break of greater than 500% and its tensile strength is greater than 10 MPa, these values being measured according to the NF T 46-002 standard on $H_3$-dumbbell test specimens. Moreover, it has an elongation of greater than 200% and an initial Young's modulus of between 200 and 300 MPa, these values being measured have a temperature of −40° C. according to the NF T-46.002 standard. This property prevents the glazing from being damaged when subjected to low temperatures.

The encapsulation material is compatible with any material intended to be in contact with it, both the material capable of flowing and ensuring degassing and, for example, a bead of adhesive used to fix the glazing on a vehicle body opening and/or a material used to constitute a sealing joint and/or a fitting joint, for example an encapsulated or extruded joint.

This encapsulation material is advantageously impermeable to water and to water vapor.

In a preferred embodiment of the invention, at least one of the first, second and third glass sheets, or additional glass sheets, is strengthened, especially chemically toughened. This measure improves the protection against piercing projectiles.

The chemical toughening, described for example in patent FR 2 595 091, consists in replacing ions on the surface of a soda-lime-silica glass sheet with, for example, other ions of larger diameter, so as to create compression.

For the same purpose, another embodiment is one in which the free surface of the first glass sheet, that is to say the face intended to receive the bullet impact(s), is coated with a mechanical reinforcement layer. This is particularly $Si_3N_4$, hydrogenated tetrahedral amorphous carbon ta—C:H (also called DLC, standing for Diamond Like Carbon), etc. The thickness of these layers in particular between 5 and 500 nm, and does not exceed, in decreasing order of preference, 300 nm, 100 nm, 50 nm and 25 nm. Typically, it is 10 nm.

$Si_3N_4$ is obtained by magnetron sputtering by means of a target made of silicon doped with a metal such as Al in order to make it sufficiently conducting, and in a nitriding atmosphere.

The DLC layers may result from the dissociation of a precursor, such as $CH_4$, $C_2H_6$, $C_2H_4$, $C_2H_2$ etc., in an ion source (whether or not based on the principle of an anode layer source, with or without a grid for accelerating the ions, excited by a DC or AC current or by microwave radiation), the stream of ions thus created being directed onto the substrate, which may or may not be heated, with energies between 100 and 2000 eV. The DLC layer may also be obtained by any other process, such as chemical vapor deposition (CVD).

According to other advantageous features of the laminated structure of the invention:

the thickness of the first and second glass sheets and additional glass sheets is between 2 and 8 mm, that of the third glass sheet between 4 and 10 mm, that of the sheet for dampening the impact of a projectile between 2 and 4 mm, that of each adhesive layer connecting two glass sheets between 0.3 and 1.5 mm and that of the adhesive layer connecting the third or last glass sheet to the sheet for dampening the impact of a projectile between 1.5 and 3.5 mm;

the sheet for dampening the impact of a projectile is made of polycarbonate or the like, usually employed for constituting the face on the side where the user to be protected is (as is well known, polycarbonate is capable of absorbing some of the energy of a bullet, possibly by deforming); and the armoring insert is made of steel or the like, with a thickness of between 1 and 4 mm, and penetrates into the laminated structure by a depth of between 3 and 20 mm from the edge of the sheet for dampening the impact of a projectile.

A major favorable effect is obtained, moreover, in a single or multiple impact, by the fact that at least one of the intermediate adhesive layers of the laminated structure that separate two sheets of glass, or a sheet of glass from a sheet of plastic such as polycarbonate, has a Young's modulus at 25° C. of at least 100 MPa, preferably 400 MPa, and particularly preferably 700 MPa. Examples of such an adhesive layer are polyvinyl butyral with a low plasticizer content (especially consisting of 100 parts of resin and 19 parts of n-hexyl adipate), a high-modulus thermoplastic polyurethane, etc.

The subject of the invention is also glazing with high bullet resistance for buildings, or for land, air or aquatic transport vehicles, comprising a laminated structure as described above.

BRIEF DESCRIPTION OF THE DRAWINGS

The invention is illustrated by the following example, which refers to the single appended FIGURE showing a cross-sectional schematic view of one side of a glazing according to the invention.

DETAILED DESCRIPTION OF THE INVENTION

Example

The glazing shown in the FIGURE comprises:
a chemically toughened soda-lime-silica glass sheet (1) measuring 404×404 mm with a thickness of 4 mm;
a chemically toughened soda-lime-silica glass sheet (3) measuring 332×332 mm and having a thickness of 3 mm;

a chemically toughened soda-lime-silica glass sheet (5) measuring 346×346 mm and having a thickness of 6 mm; and a polycarbonate sheet (11) measuring 364×364 mm and having a thickness of 3 mm.

These sheets are all centered with respect to one another so that the edges of the sheet (3) are, on all sides, set back by 36 mm from those of the sheet (1), by 7 mm from those of the sheet (5), which are themselves set back by 9 mm from those of the polycarbonate sheet (11).

The sheets (1) and (3) are connected via a thermoplastic polyurethane adhesive layer (2) 0.76 mm in thickness covering the entire surface of the sheet (1).

The sheets (3) and (5) are connected via a standard polyvinyl butyral adhesive layer (4) 1.14 mm in thickness covering at least the smallest surface (3) of the two glass sheets.

The sheets (5) and (11) are connected via a thermoplastic polyurethane adhesive layer (10) 2.5 mm in thickness also covering at least the smallest surface (5) of the sheets (5) and (11).

The armoring insert (20) forms a steel frame with the same external dimensions as those of the glass sheet (1), being 35 mm in width and 2 mm in thickness. Its outer edge is aligned with that of the glass sheet (1) to which it is intended to be bonded via the adhesive layer (2). The inner edge of the armoring insert (20) is thus a distance x from the edge of the second glass sheet (3), where x=1 mm.

Relative to the edge of the polycarbonate sheet (11), the armoring insert (20) emerges from the laminated structure by a distance e of 20 mm and is inserted thereinto by i=15 mm.

After bringing these constituents together and aligning them in the desired manner, a quantity of thermoplastic polyurethane (30) capable of flowing at the temperatures of assembling the laminate in the autoclave, between 100 and 140° C., is placed in the cavity extending between the armoring insert (20) and the edges of the third glass sheet (5) and of the polycarbonate sheet (11). This quantity is thus sufficient to fill, by its flowing and the degassing to which it contributes during assembly owing to the combined effect of temperature and pressure, the entire vacant space, including that shown in the FIGURE before assembly and bounded by the adhesive layer (2), the inner edge of the armoring insert (20), the edge of the second glass sheet (3) and the adhesive layer (4). The quantity of thermoplastic polyurethane (30) is of course dependent on the offset of the edge of the third glass sheet (5) relative to that of the polycarbonate sheet (11). In general, this offset is between 2.5 and 19.5 mm; in this case it is 9 mm.

This quantity of thermoplastic polyurethane (30) is covered with an encapsulation material (31) that does not soften at the temperatures at which the laminate is assembled in the autoclave. Here it is a tape of polyurethane having a softening point of around 180° C. The thickness of this tape (31), generally between 0.5 and 4 mm, is in this case 1 mm. It is preferably colored, for example black. Its Shore A hardness is for example around 85±5. It thus combines both rigidity, so as to correct the alignment faults of the sheets constituting the structure, and flexibility so as to adapt to these alignment faults, and to do so in combination with the subjacent thermoplastic polyurethane (30). The latter (30) ensures that the encapsulation material (31) is bonded to the armoring insert (20) on the one hand, and to the edge of the polycarbonate sheet (11) on the other.

The encapsulation material (31) prevents any moisture from penetrating into the laminated structure, which penetration would in particular be liable to cause delamination of the polycarbonate sheet (11).

The laminated structure was thus assembled using the conventional autoclave process at 100-140° C.

The laminated structure obtained was fired at with bullets of 44 magnum caliber at a speed of 440±10 m/s, at an angle of incidence of 45° to the vertical direction relative to the FIGURE. The structure was applied on a metal frame bearing on the free surfaces of the armoring insert (20) and of the encapsulation material (31) in the same way as an armored transport vehicle body with which the laminated structure would be equipped.

The points of impact were at a short distance indicated below, from the inner edge of the armoring insert (20), toward the interior of the laminated structure, that is to say toward the daylight portion, as the symbol+applied to this distance indicates.

A first glazing unit withstood 3 consecutive shots at +25 mm distributed over the periphery.

A second glazing unit withstood 2 shots at +25 mm, followed by one shot at +30 mm.

A third glazing unit differing from the previous two only in that the armoring insert (20) was inserted into the laminated structure at i=17 m withstood three consecutive shots distributed over the periphery at +15, +25 and +30 mm.

A fourth and fifth glazing unit, in which the armoring insert (20) was inserted into the laminated structure at i=20 mm, withstood two shots at +25 mm, followed by two shots at +30 mm.

The same shots were fired at glazing units differing from the previous ones in that the third glass sheet (5) was extended as far as the encapsulation material (32) and also the adhesive layer (10) connecting it to the polycarbonate sheet (11).

For shots identical to those described above, an in particular between +15 and +25 mm, the following observations were made:

either there was no bullet penetration, but glass splinters were projected on the side where the user to be protected was;

or one or more bullets penetrated.

These trials demonstrate the desired effectiveness of the structure of the invention.

The invention claimed is:

1. A laminated structure comprising:

at least a first glass sheet;

a second glass sheet connected to the first glass sheet via an adhesive layer, an edge of the second glass sheet being set back from an edge of the first glass sheet on at least a first side of the laminated structure;

a third glass sheet connected to the second glass sheet via an adhesive layer, the edge of the second glass sheet at the at least first side of the laminated structure being set back from an edge of the third glass sheet at the at least first side, and the edge of the third glass sheet being set back from the edge of the first glass sheet at the at least first side;

a sheet that dampens an impact of a projectile connected to the third glass sheet via an adhesive layer, the edge of the third glass sheet being set back from an edge of the sheet that dampens the impact of the projectile at the at least first side of the laminated structure;

an armoring insert made of anti-ballistic material that occupies, on at least one end of the armoring insert, at least part of a cavity bounded by a side of the first glass sheet, a side of the third glass sheet, and an end face of the second glass sheet;

an energy absorbing material arranged in a space between a side of the armoring insert, an end face of the third glass sheet, and a side of the sheet that dampens the impact of the projectile, the energy absorbing material being flowable and degassable when heated during assembly of the laminated structure such that the energy absorbing material is bonded to the armoring insert, to the end face of the third glass sheet, and to the sheet that dampens the impact of the projectile; and an encapsulation material impervious to the energy absorbing material flowing during the assembly of the laminated structure and impermeable to penetration of moisture into the laminated structure, the encapsulation material encapsulating at least an end face of the laminated structure that lies between the sheet that dampens the impact of the projectile and at least part of the armoring insert.

2. The laminated structure as claimed in claim 1, wherein the encapsulation material is set back from the edge of the first glass sheet on the at least first side of the laminated structure such that an end of the first glass sheet, and an end of the adhesive layer connecting the first glass sheet and the second glass sheet, and an end of the armoring insert define a projection with a thickness allowing the projection to be inserted into a frame or rebate in a mounting position.

3. The laminated structure as claimed in claim 1, wherein the energy absorbing material is one of a thermoplastic polymer or copolymer with a softening temperature between 80° C. and 140° C., a thermoplastic polyurethane, a thermoplastic polyurethane combined with polyvinyl butyral, ethylene/vinyl acetate copolymer, or a composite made from one or more of the foregoing materials and from fiber or fabric made of glass, aramid, polycarbonate, or steel.

4. The laminated structure as claimed in claim 1, wherein the encapsulation material does not soften at a temperatures at which the laminate is assembled in an autoclave, or between 100° C. and 140° C., the encapsulation material has a softening temperature between 145° C. and 190° C., and the encapsulation material includes a thermoplastic elastomer, polyvinyl chloride, a thermoplastic or thermosetting polyurethane, polyethylene terephthalate, neoprene, rubber, epoxy resin, or a composite made up from one or more of the foregoing materials and of fiber or fabric made of glass, aramid, polycarbonate, or steel.

5. The laminated structure as claimed in claim 1, wherein at least one of the first glass sheet, the second glass sheet, and the third glass sheet is strengthened or chemically toughened.

6. The laminated structure as claimed in claim 1, wherein the thickness of the first glass sheet and second glass sheet is between 2 and 8 mm, the thickness of the third glass sheet is between 4 and 10 mm, the thickness of the sheet that dampens the impact of the projectile is between 2 and 4 mm, the thickness of the each adhesive layer connecting two glass sheets is between 0.3 and 1.5 mm, and the thickness of the adhesive layer connecting the third glass sheet to the sheet that dampens the impact of the projectile is between 1.5 and 3.5 mm.

7. The laminated structure as claimed in claim 1, wherein the sheet that dampens the impact of the projectile is made of polycarbonate.

8. The laminated structure as claimed in claim 1, wherein the armoring insert is made of steel, with a thickness of between 1 and 4 mm, and penetrates into the laminated structure by a depth of between 3 and 20 mm from the edge of the sheet that dampens the impact of the projectile.

9. The laminated structure as claimed in claim 1, further comprising one or more additional glass sheets connected to the third glass sheet and/or to one another via one or more adhesive layers.

10. The laminated structure as claimed in claim 1, wherein
the encapsulation material is bonded to a side of the armoring insert and to an end face of the sheet that dampens the impact of the projectile, and the encapsulation material encapsulates at least a portion of an end face of the laminated structure that lies between the sheet that dampens the impact of the projectile and the armoring insert.

11. The laminated structure as claimed in claim 1, wherein the encapsulation material is polyurethane.

12. A glazing comprising:
a laminated structure including
at least a first glass sheet,
a second glass sheet connected to the first glass sheet via an adhesive layer, an edge of the second glass sheet being set back from an edge of the first glass sheet on at least a first side of the laminated structure, a third glass sheet connected to the second glass sheet via an adhesive layer, the edge of the second glass sheet at the at least first side of the laminated structure being set back from an edge of the third glass sheet at the at least first side, and the edge of the third glass sheet being set back from the edge of the first glass sheet at the at least first side, a sheet that dampens impact of a projectile connected to the third glass sheet via an adhesive layer, the edge of the third glass sheet being set back from an edge of the sheet that dampens the impact of the projectile at the at least first side of the laminated structure, an armoring insert made of anti-ballistic material that occupies, on at least one end of the armoring insert, at least part of a cavity bounded by a side of the first glass sheet, a side of the third glass sheet, and an end face of the second glass sheet, an energy absorbing material arranged in a space between a side of the armoring insert, an end face of the third glass sheet, and a side of the sheet that dampens the impact of the projectile, the energy absorbing material being flowable and degassable when heated during assembly of the laminated structure such that the energy absorbing material is bonded to the armoring insert, to the end face of the third glass sheet, and to the sheet that dampens the impact of the projectile, and an encapsulation material impervious to the energy absorbing material flowing during the assembly of the laminated structure and impermeable to penetration of moisture into the laminated structure, the encapsulation material encapsulating at least an end face of the laminated structure that lies between the sheet that dampens the impact of the projectile and at least part of the armoring insert.

* * * * *